US006914195B2

(12) United States Patent
Archambault et al.

(10) Patent No.: US 6,914,195 B2
(45) Date of Patent: Jul. 5, 2005

(54) DISTRIBUTION TRANSFORMER

(75) Inventors: Marc-Antoine Archambault, Montreal (CA); Bernard Lefebvre, Montreal (CA); Viet Pham, St. Laurent (CA); Daniel Bastarache, Trois-Rivières (CA); Christian Fournelle, Trois-Rivières (CA); René Laprise, Trois-Rivières (CA); Guy Morissette, Trois-Rivières (CA)

(73) Assignee: VA Tech Transformateurs Ferranti-Packard (Quebec) Inc., Trois-Rivieres (CA)

(*) Notice: Subject to any disclaimer, the term of this patent is extended or adjusted under 35 U.S.C. 154(b) by 91 days.

(21) Appl. No.: 10/425,637

(22) Filed: Apr. 30, 2003

(65) Prior Publication Data

US 2004/0217836 A1 Nov. 4, 2004

(51) Int. Cl.[7] .................................................. H02G 3/00

(52) U.S. Cl. .................... 174/160; 174/17 VA; 174/18; 174/17 LF; 174/37; 174/11 BH; 174/12 BH; 174/14 BH; 174/15 BH; 174/16 BH; 174/15 R; 174/16 R; 174/17 GF; 174/17 CT; 174/50; 174/52 R; 336/65; 336/67; 336/92; 336/90; 336/59; 336/58; 336/60; 165/130; 165/131; 165/170; 220/44 R

(58) Field of Search ........................... 174/100, 17 VA, 174/18, 17 LF, 37, 11 BH, 12 BH, 14 BH, 15 BH, 16 BH, 15 R, 16 R, 17 GF, 17 CT, 50, 52 R; 336/65, 67, 92, 90, 59, 58, 60; 165/130, 131, 170; 220/44 R

(56) References Cited

U.S. PATENT DOCUMENTS

| | | | | | |
|---|---|---|---|---|---|
| 3,599,134 | A | * | 8/1971 | Galloway | 336/230 |
| 3,710,002 | A | * | 1/1973 | Link | 174/18 |
| 3,772,624 | A | * | 11/1973 | Keogh | 336/55 |
| 4,209,064 | A | * | 6/1980 | Cacalloro et al. | 165/130 |
| 4,745,966 | A | * | 5/1988 | Avery | 165/104.33 |
| 6,147,581 | A | * | 11/2000 | Rancourt et al. | 336/65 |

OTHER PUBLICATIONS

Claude Paradis; "Design Characteristics of Submersible Solid Insulation Distribution Transformers"; MEA—1999 Engineering and Operations Conference, Toronto Airport Marriot Hotel, Jan. 13–15, 1999.

"The Solid Distribution Transformer (SDT) ".

* cited by examiner

*Primary Examiner*—Dean A. Reichard
*Assistant Examiner*—Anton Harris
(74) *Attorney, Agent, or Firm*—Ogilvy Renault LLP

(57) ABSTRACT

An oil-filled pole-mounted distribution transformer comprises a tank housing a transformer core-coil assembly immersed in cooling oil. The tank is made of a corrosion-proof composite material and a radiator is provided for cooling the oil. The radiator is external to the tank and has a hot oil inlet and a cool oil outlet located at different levels into the tank for causing a natural circulation of oil through the radiator by thermal siphoning.

26 Claims, 5 Drawing Sheets

DISTRIBUTION TRANSFORMER

BACKGROUND OF THE INVENTION

1. Field of the Invention

The present invention relates to distribution transformers and, more particularly, to enclosures for such transformers.

2. Description of the Prior Art

Distribution transformers are used to convert the high-voltage electricity delivered by power lines to the 120/240-volt supply needed for consumers. Typically, one distribution transformer supplies power to several homes. The distribution transformers come in three varieties: the pole-mounted transformers; the ground-level pad-mounted transformers; and the underground transformers.

The pole-mounted transformers and the pad-mounted transformers herein referred to as above-ground transformers require are generally filled with an insulating liquid, such as oil. Heretofore, the tanks of such oil-filled transformers have been made of steel, which is known for its good heat conducting properties. In this way, the heat generated by the core-coil assembly of the transformers is absorbed by the oil in which the core-coil assembly is immersed and the heat is dissipated into the ambient air through the wall of the metal tank.

One of the problems with metal transformers is that they are subject to corrosion problems, which significantly limit the useful life of the transformers. While stainless steel tanks would solve the corrosion problem, such tanks would be too expensive to manufacture. As to plastic materials, they have heretofore not been used in the fabrication of oil-filled transformer tank because of their heat insulating properties.

It would be desirable to have a new oil-filled transformer tank that is corrosion-proof and relatively economical to manufacture, while still allowing for proper heat dissipation of the heat generated by the transformer core-coil assembly.

SUMMARY OF THE INVENTION

It is therefore an aim of the present invention to protect above-ground distribution transformers against corrosion problems.

It is also an aim of the present invention to extend the service life of oil-filled distribution transformers.

It is a further aim of the present invention to provide a new corrosion resistant tank for an oil-filled distribution transformer.

It is a further aim of the present invention to provide a new oil-filled distribution transformer which is relatively simple and economical to manufacture.

It is a still further aim of the present invention to provide an oil-filled electric equipment tank which has added safety features.

It is a still further aim of the present invention to facilitate the mounting of a distribution transformer to a service pole.

It is a still further aim of the present invention to facilitate access to the terminal connectors of a pole-mounted distribution transformer.

It is a still further aim of the present invention to provide an oil-filled pole-mounted distribution transformer which is aesthetic.

Therefore, in accordance with the present invention, there is provided an oil-filled pole-mounted distribution transformer, comprising a transformer tank defining a hermetically sealed chamber, a transformer core-coil assembly disposed in said chamber, cooling oil surrounding said transformer core-coil assembly and filling said chamber, said transformer tank being made of a corrosion-proof composite material, and a radiator external to said sealed chamber and having a hot oil inlet and a cool oil outlet located at different levels into said sealed chamber for causing a natural circulation of oil through said radiator by thermal siphoning.

In accordance with a further general aspect of the present invention, there is provided an above-ground distribution transformer comprising a transformer tank, and a transformer core-coil assembly immersed within a dielectric liquid inside the transformer tank, said transformer tank being made of a corrosion-resistant material, and an air-cooled radiator mounted on an outer surface of said transformer tank and having a liquid inlet and a liquid outlet connected in fluid flow communication with an interior of said transformer tank for permitting a circulation of the dielectric fluid from said transformer tank, through said air-cooled radiator, and back into said transformer tank.

In accordance with a still further general aspect of the present invention, there is provided a tank for housing an electrical component immersed in a dielectric fluid, comprising a hollow body made of a non-conducting material and defining a chamber filled with a dielectric fluid, a radiator provided on an outer surface of said body, said radiator having an inlet for receiving hot dielectric fluid from said chamber and an outlet for directing cooled dielectric back into said chamber.

The term pole-mounted transformer is herein intended to refer to any distribution transformer of the type adapted to be mounted on an electrical service pole, usually at the level of the overhead cables but occasionally at ground level in a vault.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
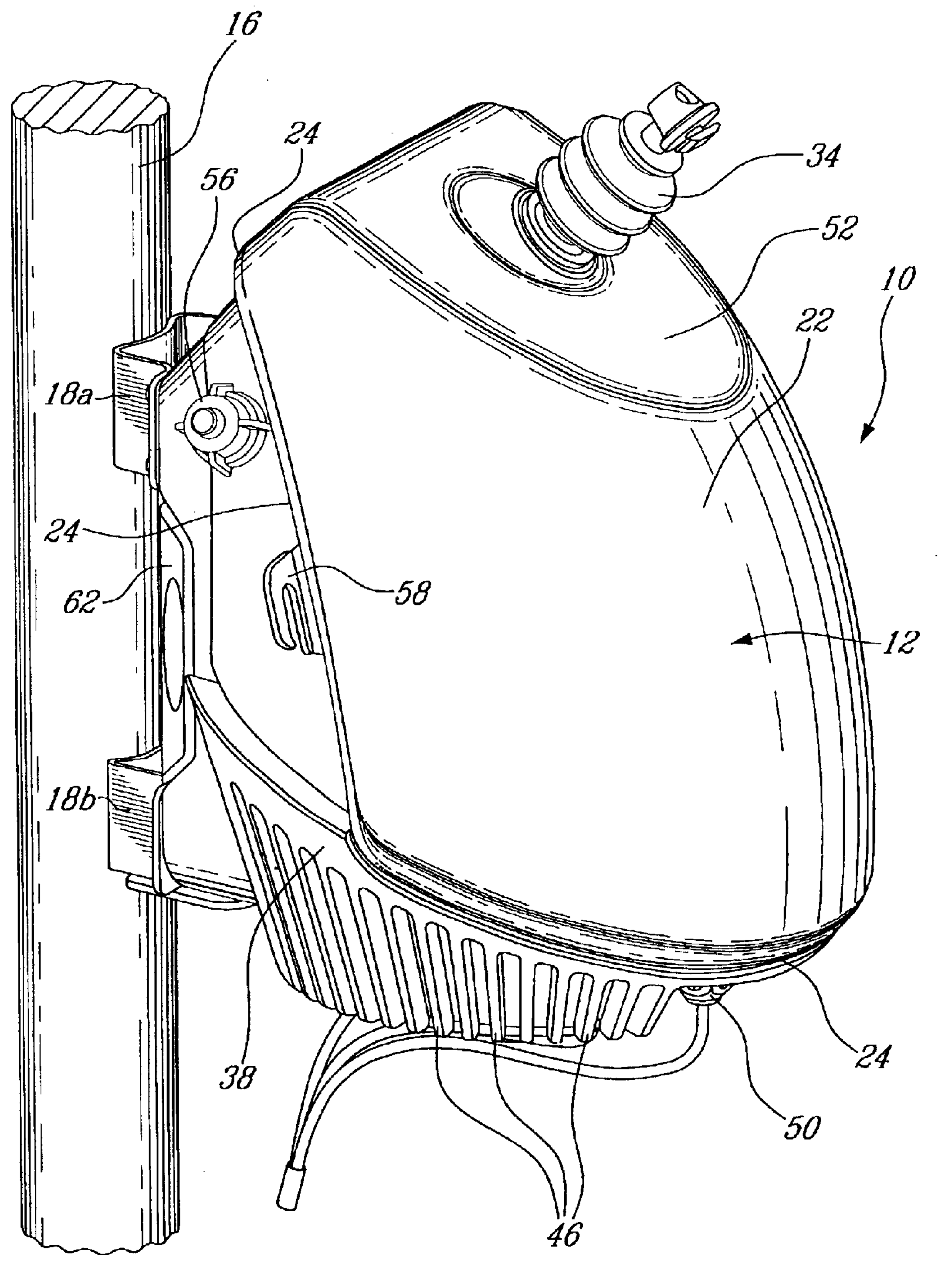
FIG. 1 is a perspective view of an oil-filled pole-mounted distribution transformer in accordance with a preferred embodiment of the present invention.

FIG. 1 illustrates an oil-filled pole-mounted distribution transformer 10 suited for converting distribution voltage to the 120/240 volt power used by homes and low-volume commercial installations. The distribution transformer 10 generally comprises a thermoplastic tank 12 housing a conventional core-coil assembly 14 (see FIGS. 2 and 4) immersed in a dielectric liquid, such as oil. The thermoplastic tank 12 is removably mounted to an electrical service pole 16 by a pair of mounting brackets 18*a* and 18*b*.

Figure 2:
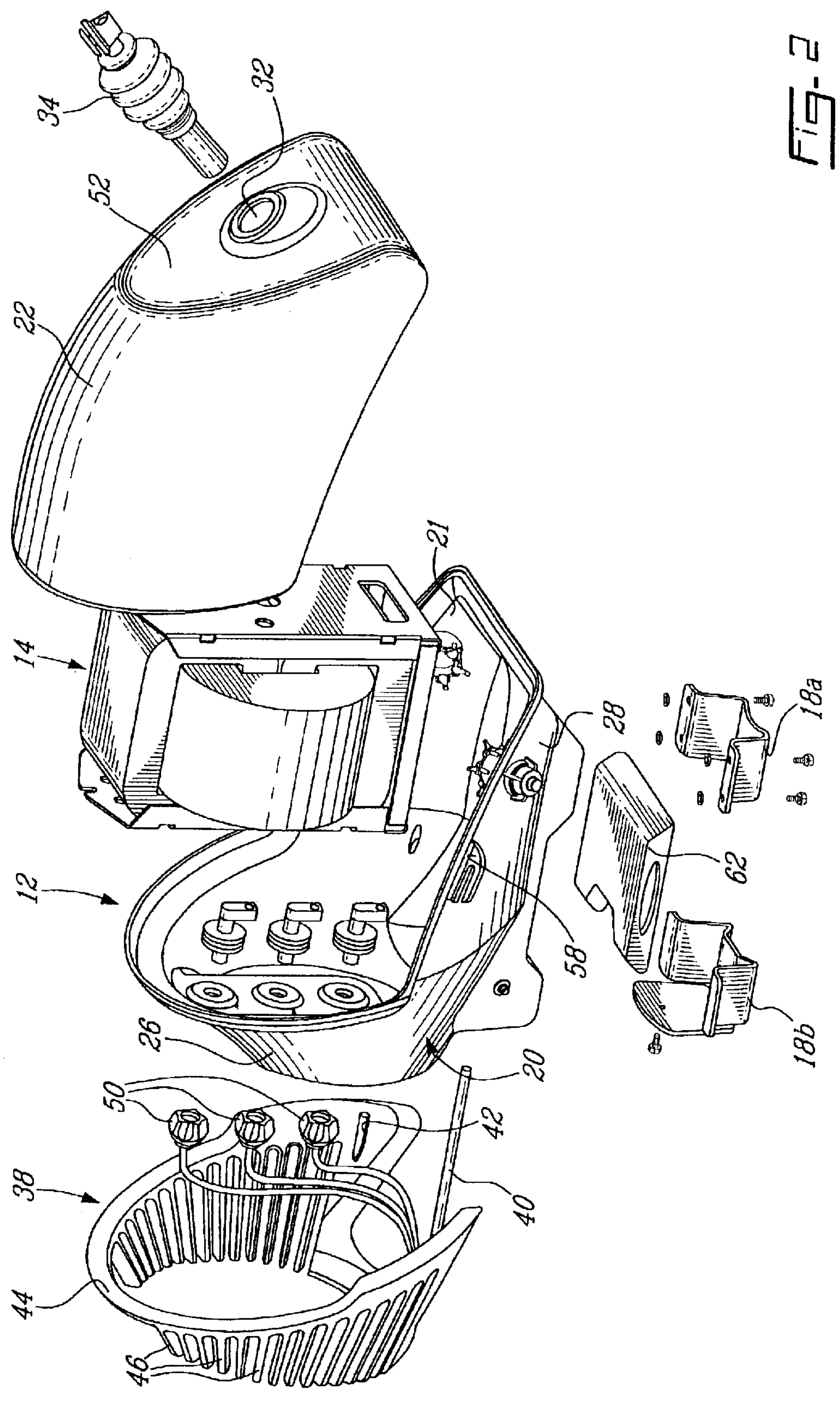
FIG. 2 is an exploded perspective view of the oil-filled pole-mounted distribution transformer shown in FIG. 1.

As shown in FIG. 2, the transformer tank 12 comprises a shell 20 defining a front loading opening 21 adapted to be covered by a front cover 22 to form a hermetically sealed chamber. The shell 20 and the front cover 22 are joined to each other along a parting line 24 (FIG. 1) or seam extending substantially horizontally at the front and the top of the tank 12 and upwardly along the sides thereof. The shell 20 and the cover 22 are both made of thermoplastic materials, such as a resin material loaded with non-conductive fibers, and are sealingly joined to each other as by fusion bonding. According to a preferred embodiment of the present invention, an adhesive in the form of glue is used to sealingly bond the cover 22 to the shell 20. It is noted that the cover 22 and the shell 20 can be made of any sheet molding compound (SMC).

Figure 4:
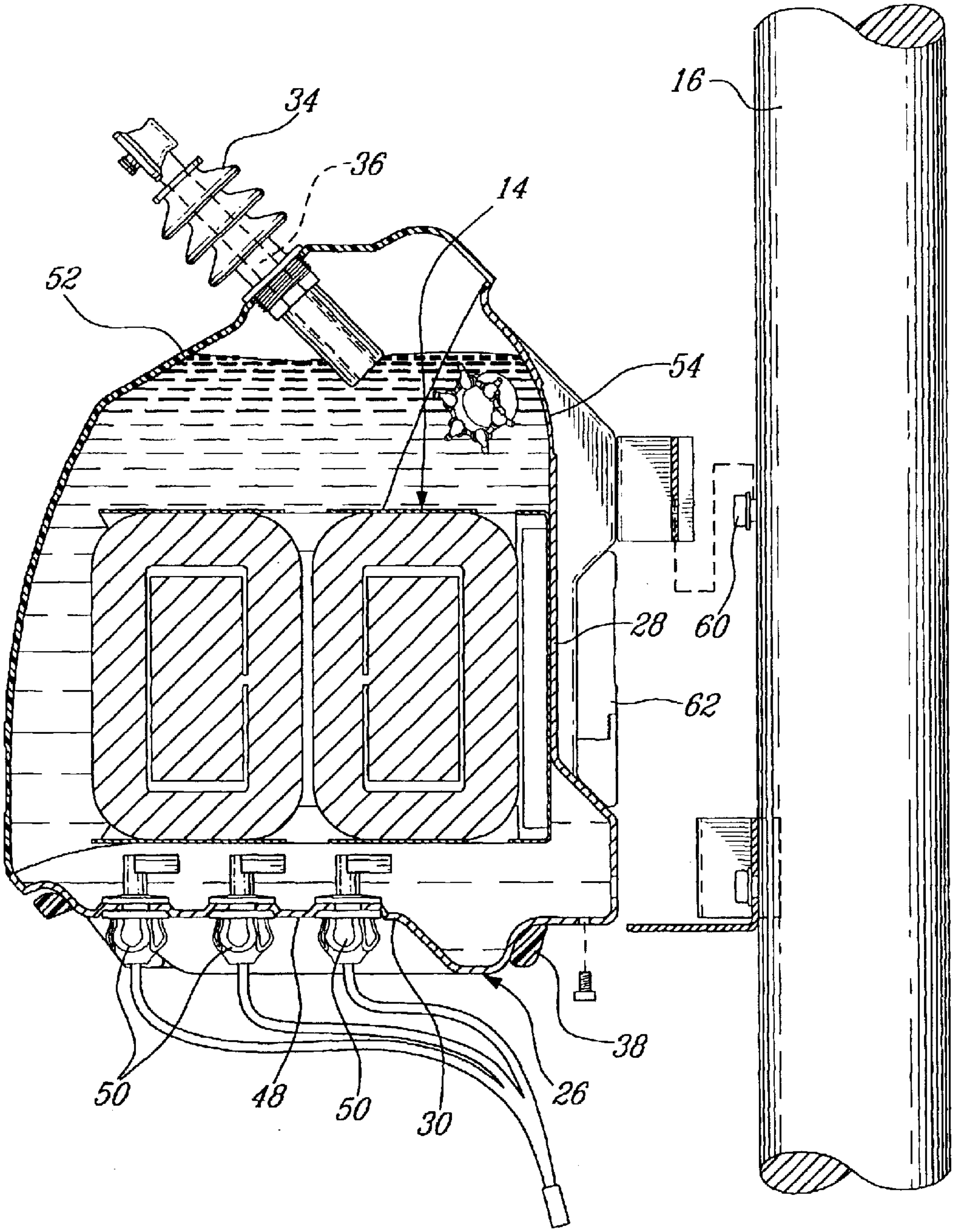
FIG. 4 is a cross-sectional side view of the oil-filled pole-mounted distribution transformer.

The shell 20 includes a hollow generally frustoconical base portion 26 and a back wall 28 extending upwardly from the base portion 26. The base portion 26 has a bottom wall 30 (FIG. 4). The back wall 28 as well as the bottom wall 30 is configured to offer a uniform support surface for allowing the shell 20 to be supported in a stable manner in either one of a horizontal or a vertical orientation. As shown in FIG. 2, during the assembling procedures, the shell 20 is supported in a horizontal orientation to facilitate placement of the various transformer components, including the core-coil assembly 14, in the shell 20. This constitutes a major advantage over conventional top open ended cylindrical pole-mounted transformer tanks.

Once the various internal transformer components have been installed in the shell, the cover 22 is sealing joined to the shell 20 to form the hermitically closed chamber. As shown in FIG. 2, a hole 32 is defined in the cover 22 for receiving a high voltage bushing 34. Before sealingly mounting the bushing 34 in the hole 32, the tank 12 is filled with oil through the hole 32. Thereafter, the bushing 34 is inserted in the hole 32 and the air remaining in the tank 12 is withdrawn therefrom via an axially extending air vacuum passage 36 defined centrally through the bushing 34. The air vacuum passage is subsequently closed as by a valve (not shown) mounted to the bushing 34 or simply plugged. This arrangement greatly simplifies the procedure for withdrawing air from the tank 12 once the same has been filled with oil.

Figure 3:
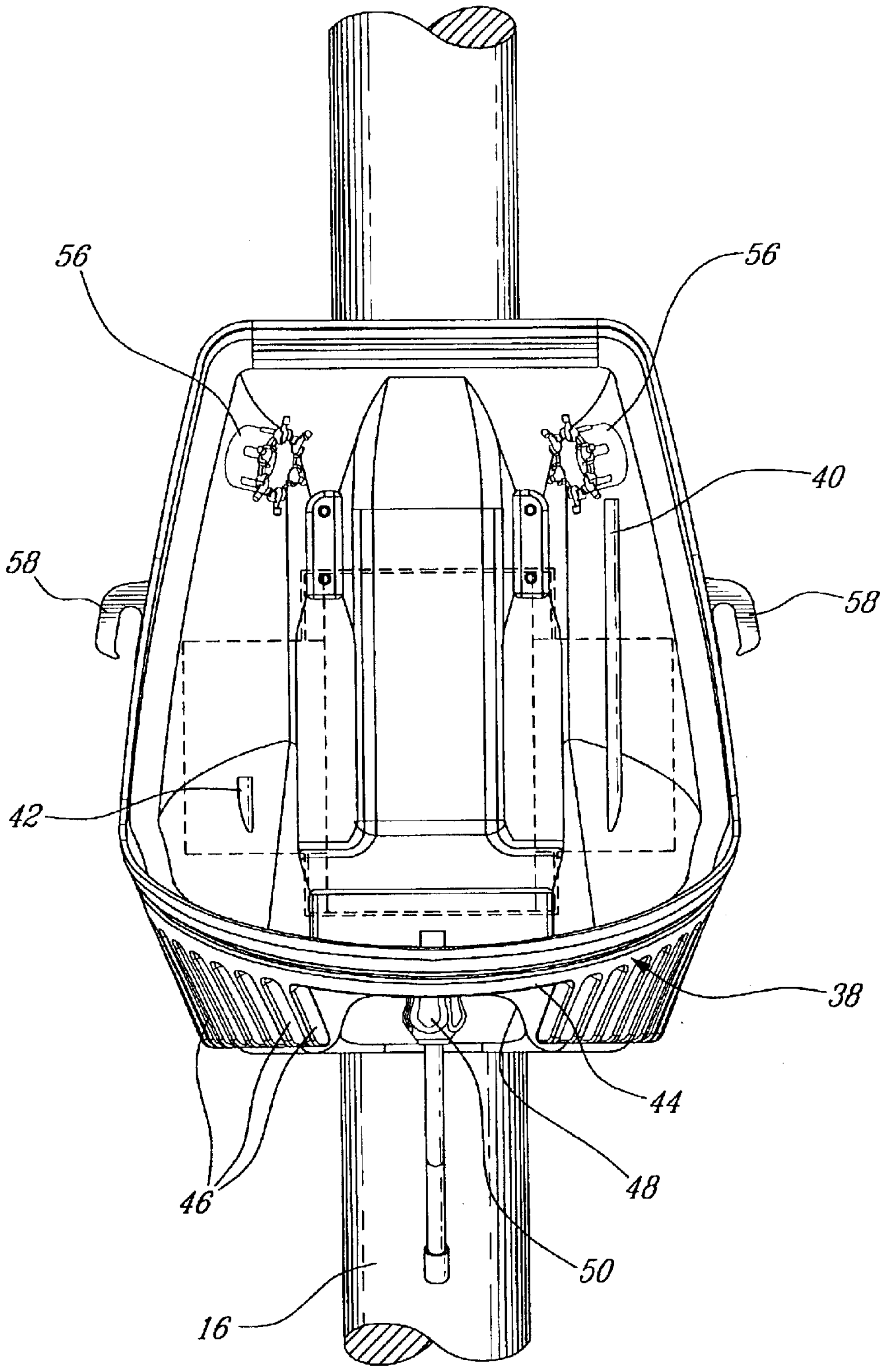
FIG. 3 is a front view of the oil-filled pole-mounted distribution transformer with the cover thereof omitted for clarity purposes.

The use of a thermoplastic tank instead of a conventional metal tank is advantageous in that it is not subject to corrosion, thereby the service life of the transformer can be significantly extended. To compensate for the thermal insulating properties of thermoplastic materials and to ensure proper cooling of the oil contained in the tank 12, it is herein proposed to removably mount an air-cooled radiator 38 directly on the outer surface of the hollow frustoconical base portion 26 of the shell 20. As shown in FIGS. 2 and 3, the radiator 38 has a generally frustoconical configuration and is adapted to be fitted over the base portion 26 of the shell 20. The radiator 38 includes a long inlet pipe 40 and a short outlet pipe 42 provided at opposed ends of an external oil cooling pathway 44. The inlet pipe 40 and the outlet pipe 42 both vertically extend through the wall of the base portion 26 of the shell 20 into the chamber formed by the shell 20 and the cover 22. As can be seen from FIG. 3, the inlet pipe 40 projects further into the chamber than the outlet pipe 42. In other words, the free distal end of the inlet pipe 40 is located at a higher elevation than the free distal end of the outlet pipe 42. This level difference provides for a passive circulation of oil from the tank chamber, into the inlet pipe 40 of the radiator 38, through the external cooling pathway 44 and back into the tank chamber via the outlet pipe 42. Heated oil, which is less dense because it occupies more volume per unit mass, is displaced by denser colder oil, and so rises to the top of the tank where the inlet pipe 40 is located. This density-displacement causes a thermal siphoning of the hot oil from the tank chamber via the inlet pipe. The expression "thermal siphoning" is understood to refer to the flow of oil which occurs due to hot oil rising by natural convection. The present invention takes advantage of this natural phenomenon to provide for a passive circulation of oil through the radiator 38.

A plurality of spaced-apart downwardly extending cooling fins 46 are provided along the external cooling pathway 44 to effect a better cooling of the oil as it travels theretrough.

As shown in FIGS. 3 and 4, a recess 48 is defined in the outer surface of the bottom wall 30 to accommodate a set of terminal connectors 50. As opposed to the terminal connectors of conventional steel transformers which are typically mounted to the side wall of the tank at the top end of the transformer, the terminal connectors 50 can be sealingly mounted in proximity to one another to the bottom wall 30 of the tank 12, thereby offering better access to lineman. The recess prevents accumulation of water around the terminal connectors 50 and also provided added physical protection for the connectors 50. The location of the terminal connectors 50 is also advantageous in that it facilitates access thereto. The terminal connectors 50 are electrically isolated from each other due to the insulating properties of the plastic material of which is made the shell 20.

As best seen in FIGS. 1 and 4, the cover 22 has a top slopped surface 52 to prevent accumulation of snow or ice on the top of the tank 12.

As shown in FIG. 4, a weakening zone 54 is defined in the wall of the tank 12 at a location determined by the needs of the client or by the standards and regulations, which are in force.

As shown in FIGS. 1 and 3, the transformer 10 is provided with a pair of tap selectors 56. The selectors 56 are located at the top of the side wall, thereby giving visual access to the selectors 56.

As shown in FIGS. 1 and 3, a pair of hoisting hooks 58 is provided on opposed sides of the transformer tank 12. The hoisting hooks 58 are preferably made of a composite material and bolted to the back wall 28 of the shell 20.

Figure 5:
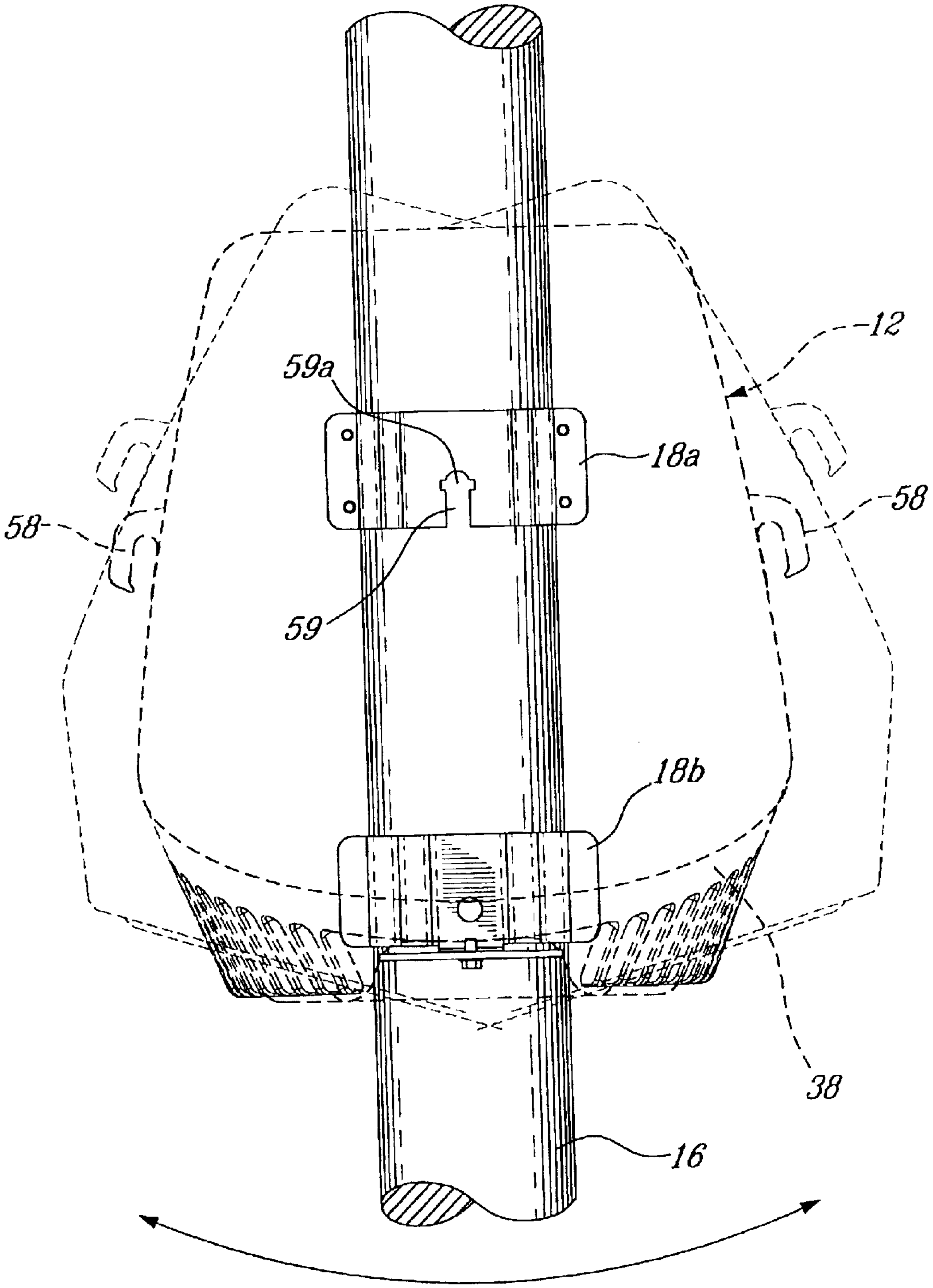
FIG. 5 is a schematic simplified front view of the oil-filled pole-mounted distribution transformer illustrating the procedure to mount the distribution transformer to an electrical service pole.

As shown in FIGS. 2, 4 and 5 the mounting brackets 18*a* and 18*b* are preferably molded from a composite material. The top mounting bracket 18*a* is first securely mounted to the back wall 28 of the tank 12 as for instance through the use of screws. As shown in FIG. 5, the top mounting bracket 18*a* defines an open ended slotted opening 59 having a seat 59*a* for allowing the tank 12 to be hung on a bolt 60 extending from the service pole 16. As opposed to the top mounting bracket 18*a*, the bottom mounting bracket 18*b* is first bolted to the service pole 16. As illustrated in FIG. 5, the tank 12 can be pivoted sideways due to the engagement of the bolt 60 in the slotted opening 59. This facilitates the alignment procedures for securing the tank to the bottom bracket 18*b*. Once the tank 12 has been properly aligned, the bottom bracket 18*b* is screwed to the tank 12 for locking the same against pivotal movement about the bolt 60, as shown in FIG. 4.

As shown in FIGS. 1, 2 and 4, an electronic box 62 used for data transmission can be mounted in snapping engagement between the brackets 18*a* and 18*b* at a distance from the outer surface of the back wall 28 to permit water to drain along the back wall 28.

Another advantage of the thermoplastic tank 12 resides in the fact that each the shell 20 and the cover 22 can be stacked with similar shells and covers, thereby considerably reducing the space required for storage purposes.

What is claimed is:

1. An oil-filled pole-mounted distribution transformer, comprising a transformer tank defining a hermetically sealed chamber, a transformer core-coil assembly disposed in said chamber, cooling oil surrounding said transformer core-coil assembly and at least partly filling said chamber, wherein said transformer tank comprises a shell having a frontal opening providing access to an internal space thereof for facilitating the installation of said transformer core-coil assembly in said shell, and a front cover for sealing closing said frontal opening in order to form said sealed chamber once the transformer core-coil assembly has been installed therein.

2. An oil-filled pole-mounted distribution transformer as defined in claim 1, further comprising a radiator external to said sealed chamber and having a hot oil inlet and a cool oil outlet located at different levels into said sealed chamber for causing a natural circulation of oil through said radiator by thermal siphoning wherein said radiator is removably mounted to an outer wall of said transformer tank.

3. An oil-filled pole-mounted distribution transformer as defined in claim 2, wherein said radiator is configured to generally surround a base portion of said transformer tank.

4. An oil-filled pole-mounted distribution transformer as defined in claim 2, wherein said radiator is provided with first and second pipes extending through said transformer tank into said chamber, said first pipe projecting further into said chamber than said second pipe, wherein said hot oil inlet and said cool oil outlet are respectively provided in said first and second pipes.

5. An oil-filled pole-mounted distribution transformer as defined in claim 4, wherein said radiator defines a fluid pathway outwardly of said transformer tank between said first and second pipes, said fluid pathway being exposed to ambient air for cooling the oil as the oil flows through the radiator.

6. An oil-filled pole-mounted distribution transformer as defined in claim 1, wherein said chamber is filled via an opening defined in said cover, said opening being pluggable once said chamber has been filled with oil by a high voltage bushing.

7. An oil-filled pole-mounted distribution transformer as defined in claim 6, wherein said bushing defines a passage for withdrawing the air that is still present in the chamber once the chamber has been filled with oil.

8. An oil-filled pole-mounted distribution transformer as defined in claim 1, wherein said shell includes a hollow base portion from which extends a back wall, and wherein said cover and said shell are sealingly joined along a parting line running below an upper level of the cooling oil.

9. An oil-filled pole-mounted distribution transformer as defined in claim 1, wherein said shell has a bottom wall and a back wall extending from said bottom wall, both said bottom wall and said back wall offering a uniform support surface for allowing said transfer tank to be supported in a stable manner in a selected one of vertical and horizontal orientations.

10. An oil-filled pole-mounted distribution transformer as defined in claim 1, further including terminal connectors, and wherein said transformer tank has a bottom wall, said bottom wall having an outer surface defining a recess, said terminal connectors being mounted in said recess, thereby affording added protection for said connectors.

11. An oil-filled pole-mounted distribution transformer as defined in claim 10, wherein said terminal connectors are electrically isolated from one another by the material forming the bottom wall, thereby allowing the terminal connectors to be grouped in a relatively closed relationship on the transformer tank.

12. An oil-filled pole-mounted distribution transformer as defined in claim 1, wherein said transformer tank has a back wall by which said transformer tank is adapted to be mounted to a service pole, wherein said back wall is provided with a zone of weakness.

13. An oil-filled pole-mounted distribution transformer as defined in claim 1 in combination with a utility pole, further including first and second mounting brackets securable to a back wall of said transformer tank to permit mounting thereof to the utility pole, said first bracket defining a slotted opening by which said transformer tank is pivotally mounted to a first bolt extending from the utility pole, said second bracket having a first portion bolted to the utility pole and a second portion adapted to engage the transformer tank for locking the tank against pivotal movement about the first bolt.

14. An oil-filled pole-mounted distribution transformer as defined in claim 1, wherein said transformer tank has a top slopped surface.

15. An oil-filled pole-mounted distribution transformer as defined in claim 1, wherein said transformer tank includes first and second tank members adapted to be assembled together to form said hermetically sealed chamber, said first and second tank members having respective nesting surfaces for allowing similar first and second tank members to be stacked for storage purposes.

16. An above-ground distribution transformer comprising a transformer tank, a transformer core-coil assembly immersed within a dielectric liquid inside the transformer tank, and a set of terminal connectors, said terminal connectors being mounted to an undersurface of the transformer tank.

17. An above-ground distribution transformer as defined in claim 16, further comprising an air-cooled radiator mounted on an outer surface of said transformer tank and having a liquid inlet and a liquid outlet connected in fluid flow communication with an interior of said transformer tank for permitting a circulation of the dielectric fluid from said transformer tank, through said air-cooled radiator, and back into said transformer tank, wherein said radiator is provided with first and second pipes extending into said transformer tank, said first pipe projecting further into the tank than said second pipe, and wherein said liquid inlet and said liquid outlet are respectively provided in said first and second pipes.

18. An above-ground distribution transformer as defined in claim 17, wherein said radiator is configured to generally surround a base portion of said transformer tank.

19. An above-ground distribution transformer as defined in claim 17, wherein said transformer tank defines an opening through which said transformer tank is filled with said dielectric liquid, said opening being pluggable by a high voltage bushing.

20. An above-ground distribution transformer as defined in claim 16, wherein said transformer tank includes a shell and a cover, said shell including a hollow base portion from which extends a back wall, and wherein said cover and said shell are sealingly joined along a parting line running at the front, the side and the top of the transformer tank.

21. An above-ground distribution transformer as defined in claim 18, said under surface defining a recess, said terminal connectors being mounted in said recess, thereby affording added protection for said connectors.

22. A tank for housing an electrical component immersed in a dielectric fluid, comprising a hollow body defining a sealed chamber at least partly filled with a dielectric fluid, wherein said body is provided in the form of a shell having a frontal opening providing access to said sealed chamber and through which the electrical component is placed in said shell, and a front cover for sealingly closing said frontal opening in order to form said sealed chamber once the electrical component has been installed therein, wherein said frontal opening extends over a major portion of a front surface of said shell, and wherein a seam between said shell and said front cover extens below an upper level of the dielectric fluid in said sealed chamber.

23. A tank as defined in claim 22, wherein a radiator is provided on an outer surface of said body, said radiator having an inlet for receiving hot dielectric fluid from said chamber and an outlet for directing cooled dielectric back into said chamber.

24. A tank as defined in claim 23, wherein said radiator is provided with first and second pipes extending into said body, said first pipe projecting further into said body than said second pipe, and wherein said inlet and said outlet are respectively provided in said first and second pipes.

25. A tank as defined in claim 22, wherein said shell includes a hollow base portion from which extends a back wall, and wherein said cover and said shell are sealingly joined along a parting line running at the front, the side and the top of the tank.

26. A tank as defined in claim 22, wherein said shell has a bottom wall, said bottom wall having an outer surface defining a recess for receiving terminal connectors of the electrical component.

* * * * *